(12) United States Patent
Taillon (10) Patent No.: US 10,436,626 B2
(45) Date of Patent: Oct. 8, 2019

(54) MULTI-CHANNEL FLUID LEVEL SENSOR (71) Applicant: PRATT & WHITNEY CANADA CORP., Longueuil (CA)

(72) Inventor: Eric Taillon, St-Amable (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 265 days.

(21) Appl. No.: 15/661,877

(22) Filed: Jul. 27, 2017

(65) Prior Publication Data
US 2019/0033118 A1    Jan. 31, 2019

(51) Int. Cl.
| | | |
|---|---|---|
| *G01F 23/30* | (2006.01) | |
| *G01F 23/64* | (2006.01) | |
| *G01F 23/68* | (2006.01) | |
| *G01F 23/70* | (2006.01) | |
| *G01F 23/74* | (2006.01) | |

(52) U.S. Cl.
CPC .............. *G01F 23/30* (2013.01); *G01F 23/64* (2013.01); *G01F 23/68* (2013.01); *G01F 23/706* (2013.01); *G01F 23/74* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,976,146 | A | * | 12/1990 | Senghaas ................ | G01F 23/74 73/319 |
| 5,012,762 | A | * | 5/1991 | Moskvin .................. | A01J 5/01 119/14.17 |
| 5,347,864 | A | * | 9/1994 | Senghaas ............ | G01F 23/0069 200/840 |
| 5,399,875 | A | * | 3/1995 | Crowne .............. | G01F 23/0061 250/577 |
| 5,530,258 | A | * | 6/1996 | Crowne .............. | G01F 23/0061 250/577 |
| 5,723,870 | A | * | 3/1998 | Crowne ................ | B64D 37/00 250/221 |
| 5,829,303 | A | * | 11/1998 | Fraser .................... | G01F 23/72 73/319 |
| 5,886,559 | A | * | 3/1999 | Berrill .................... | G01D 5/145 327/334 |
| 6,915,692 | B2 | * | 7/2005 | Ricco .................... | F02M 37/103 73/313 |

(Continued)

*Primary Examiner* — Harshad R Patel
*Assistant Examiner* — Tran M. Tran
(74) *Attorney, Agent, or Firm* — Norton Rose Fulbright Canada LLP (57) ABSTRACT

Methods and systems for measuring a level of a fluid. A first output is obtained from first sensing elements at a first electrical circuit, the first sensing elements configured to produce the first output based on a position of a floater movable along a floater path. The position of the floater is determined at the first electrical circuit based on the first output. A second output is obtained from second sensing elements at a second electrical circuit, the second electrical circuit being isolated from the first electrical circuit, at least one of the first sensing elements being interleaved with at least one of the second sensing elements, the second sensing elements configured to produce the second output based on the position of the floater. The position of the floater is determined at the second electrical circuit based on the second output.

20 Claims, 4 Drawing Sheets

(56) References Cited

U.S. PATENT DOCUMENTS

| | | | | |
|---|---|---|---|---|
| 6,998,552 B1* | 2/2006 | Li | ............ | G01F 23/706 |
| | | | | 73/319 |
| 7,250,857 B2 | 7/2007 | Maier | | |
| 8,549,911 B2* | 10/2013 | Rudd | ............ | G01F 23/74 |
| | | | | 73/313 |
| 8,776,574 B2 | 7/2014 | Miyagawa | | |
| 8,985,964 B2* | 3/2015 | Noel | ............ | F04B 49/025 |
| | | | | 73/308 |
| 9,035,800 B2* | 5/2015 | Bommer | ............ | G01F 23/0076 |
| | | | | 73/314 |
| 9,400,204 B2* | 7/2016 | Schoenberg | ............ | G01F 25/0061 |
| 9,528,868 B2 | 12/2016 | Kharsa et al. | | |
| 2010/0000317 A1* | 1/2010 | Bron | ............ | A47J 27/2105 |
| | | | | 73/313 |
| 2015/0355014 A1* | 12/2015 | Deak | ............ | G01F 23/74 |
| | | | | 73/313 |
| 2017/0074715 A1* | 3/2017 | Bartos | ............ | G01F 23/74 |
| 2017/0092212 A1* | 3/2017 | Wang | ............ | G09G 3/20 |
| 2018/0202854 A1* | 7/2018 | Wu | ............ | G01F 23/74 |

* cited by examiner

```
┌──────────────────────────────────────────────────┐ 202
│ Obtaining a first output from first sensing elements │
│            at a first electrical circuit         │
└──────────────────────────────────────────────────┘
                        │
                        ▼
┌──────────────────────────────────────────────────┐ 204
│ Determining, at the first electric circuit, the position │
│       of a floater based on the first output     │
└──────────────────────────────────────────────────┘
                        │
                        ▼
┌──────────────────────────────────────────────────┐ 206
│ Obtaining a second output from second sensing    │
│       elements at a second electrical circuit    │
└──────────────────────────────────────────────────┘
                        │
                        ▼
┌──────────────────────────────────────────────────┐ 208
│ Determining, at the second electric circuit, the │
│  position of the floater based on the second output │
└──────────────────────────────────────────────────┘
                        │
                        ▼
┌ ─ ─ ─ ─ ─ ─ ─ ─ ─ ─ ─ ─ ─ ─ ─ ─ ─ ─ ─ ─ ─ ─ ─ ─ ┐ 210
│ Determining a fluid level based on the position of │
│                   the floater                    │
└ ─ ─ ─ ─ ─ ─ ─ ─ ─ ─ ─ ─ ─ ─ ─ ─ ─ ─ ─ ─ ─ ─ ─ ─ ┘
```

MULTI-CHANNEL FLUID LEVEL SENSOR

TECHNICAL FIELD

The present disclosure relates generally to fluid level sensors.

BACKGROUND OF THE ART

Fluid level sensors have long been used in a variety of applications, notably including various types of vehicles, such as automobiles, ships, and aircraft. As the most common form of fuel for such vehicles is liquid, namely petroleum-based fuel, fluid level sensors are used to provide information regarding a remaining stock of fuel, to avoid fuel shortage situations. In addition to fuel levels, the levels of various other fluids, such as coolant, lubricant, and the like, may also be of interest, and fluid level sensors are often used to inform operators and/or service personnel of remaining quantities of the various fluids, to avoid shortages which in certain situations lead to mechanical failure.

In certain vehicles, particularly aircraft, regulations are such that single-point failures are to be avoided or reduced as much as possible. As a result, aircraft control systems are frequently required to provide redundancy, such that failure of a first component of the control system does not prevent the control system from functioning. In the case of fluid-level-sensor-based systems, this typically requires the vehicle to be provisioned with two separate and distinct fluid level sensors, which increases the weight burden imposed on the vehicle and increases the complexity of the system.

As such, there is room for improvement.

SUMMARY

In accordance with a broad aspect, there is provided a fluid level sensor, comprising: a floater movable along a floater path in response to changes in a fluid level; first sensing elements spaced apart from one another along the floater path, at least one of the first sensing elements interleaved with at least one of the second sensing elements, the second sensing elements configured to produce a first output based on a position of the floater along the floater path; second sensing elements spaced apart from one another along the floater path, the second sensing elements configured to produce a second output based on the position of the floater; a first electric circuit coupled to the first sensing elements and configured to determine the position of the floater based on the first output; and a second electric circuit, isolated from the first electric circuit, coupled to the second sensing elements and configured to determine the position of the floater based on the second output.

In accordance with another broad aspect, there is provided a method for measuring a level of a fluid. A first output is obtained from first sensing elements at a first electrical circuit coupled to the first sensing elements, the first sensing elements configured to produce the first output based on a position of a floater movable along a floater path. The position of the floater is determined, at the first electrical circuit, based on the first output. A second output is obtained from second sensing elements at a second electrical circuit coupled to the second sensing elements, the second electrical circuit being isolated from the first electrical circuit, at least one of the first sensing elements being interleaved with at least one of the second sensing elements, the second sensing elements configured to produce the second output based on the position of the floater. The position of the floater is determined at the second electrical circuit based on the second output.

In accordance with a further broad aspect, there is provided a fluid level sensor circuit. The fluid level sensor comprises a first circuit configured for obtaining a first output from first sensing elements configured to produce the first output based on a position of a floater movable along a floater path; and for determining the position of the floater based on the first output. The fluid level sensor comprises a second circuit isolated from the first circuit and configured for obtaining a second output from second sensing elements, at least one of the first sensing elements interleaved with at least one of the second sensing elements, and configured to produce the second output based on the position of the floater; and determining the position of the floater based on the second output.

BRIEF DESCRIPTION OF THE DRAWINGS

Reference is now made to the accompanying figures in which.

It will be noted that throughout the appended drawings, like features are identified by like reference numerals.

DETAILED DESCRIPTION

A fluid level sensor located in a fluid tank or other reservoir comprises at least three components: a floater which rises and falls as the level of fluid in the reservoir changes, one or more sensing elements for detecting movement of the floater, and an electric circuit for determining the position of the floater based on signals output by the sensing elements. Traditionally, redundancy for fluid level sensors is obtained by providing two separate, independent fluid level sensors. This requires two separate floaters, which leads to large space and weight requirements for the fluid level sensors.

Figure 1:
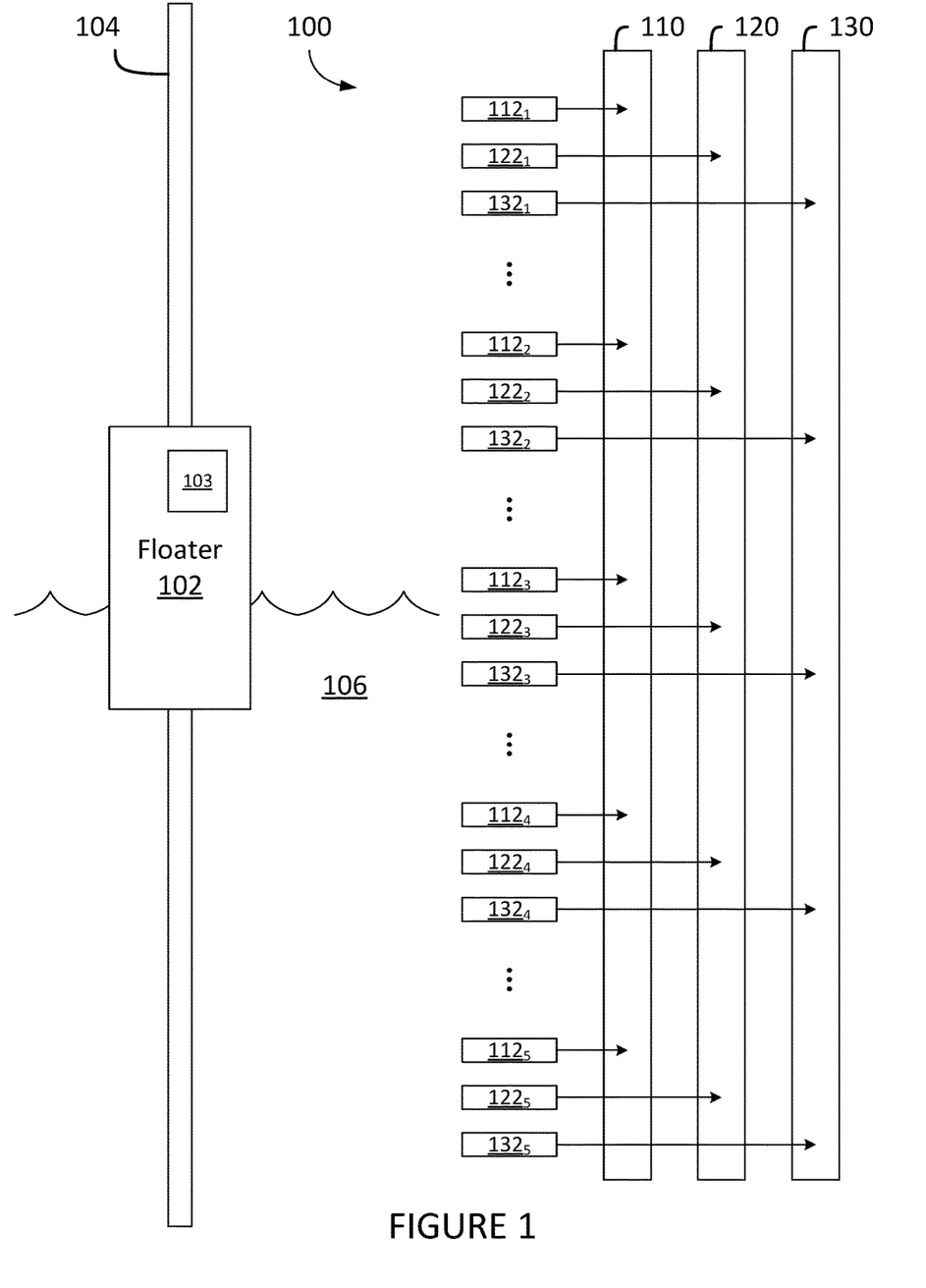
FIG. 1 is a schematic of an example multi-channel fluid level sensor.

With reference to FIG. 1, there is shown a fluid level sensor (FLS) 100 which may be located in any suitable fluid reservoir in which a fluid 106 is kept. The FLS 100 includes a floater 102, a structural member 104 which retains the floater 102, a plurality of electrical circuits 110, 120, 130 isolated from one another, and multiple sets of sensing elements $112_1$-$112_5$, $122_1$-$122_5$, $132_1$-$132_5$, each associated with one of the electrical circuits 110, 120, 130. Because the FLS 100 has multiple isolated sensing-element-and-electrical-circuit arrangements, the FLS 100 provides redundant fluid level measurements without requiring duplication of all elements of a traditional fluid level sensor.

The floater 102 may be any element having a buoyancy suitable for tracking changes in the level of the fluid 106. The fluid 106 may be water, a petroleum-based fuel or lubricant, a coolant, or any other suitable fluid. In some embodiments, the floater 102 is a plastic disk. In other embodiments, the floater is a plastic cylinder. Still other types of floaters 102 are considered. In some embodiments, the floater 102 comprises a plurality of buoyant elements, which rise and fall with the changes in the level of the fluid 106 at different rates.

The floater 102 is provided with one or more types of interactive elements 103 which are configured for causing a response in the sensing elements $112_1$-$112_5$, $122_1$-$122_5$, $132_1$-$132_5$. In some embodiments, the floater 102 is provided with magnetic elements which produce a magnetic field. In other embodiments, the floater 102 is provided with various electrical elements which produce an electric field. In further embodiments, the floater 102 is provided with optical elements. For example, the floater 102 is provided with light-emitting elements which emit a particular type of light, for instance infrared light. In another example, the floater 102 is provided with one or more reflective elements which reflect light toward the sensing elements $112_1$-$112_5$, $122_1$-$122_5$, $132_1$-$132_5$. Still other types of interactive elements 103 are considered, and embodiments where the floater 102 combines a plurality of types of interactive elements is also considered.

The floater 102 is retained by the structural member 104 in order to direct the movement of the floater 102, caused by changes in the level of the fluid 106, along a floater path. In some embodiments, including the embodiment illustrated in FIG. 1, the floater 102 is provided with an axial bore and the structural member 104 is an elongated cylindrical axle along which the floater 102 is free to move along the floater path. In other embodiments, the structural member 104 is a hollow cylinder in fluid communication with the reservoir in which the fluid 106 is held so that the fluid 106 is free to enter and exit the structural member in response to changes in the level of the fluid 106. The floater 102 is disposed within the structural member 104 and is configured to slidably move within the structural member 104 along the floater path as the fluid 106 enters and exits the structural member 104. Still other configurations for the structural member 104 and the floater 102 are considered. It should be noted that in some embodiments, the floater 102 is free-floating within the reservoir, and the structural member 104 is eschewed.

The electrical circuits 110, 120, 130 and the sensing elements $112_1$-$112_5$, $122_1$-$122_5$, $132_1$-$132_5$ cooperate to determine the position of the floater 102, which varies with changes to the level of the fluid 106. Although the embodiment of the FLS 100 shown in FIG. 1 illustrates three electrical circuits 110, 120, 130, each being associated with a respective set of the sensing elements $112_1$-$112_5$, $122_1$-$122_5$, $132_1$-$132_5$, it should be noted that other embodiments of the FLS 100 may include fewer sensing-element-and-electrical-circuit arrangements, for instance two arrangements, or may include more sensing-element-and-electrical-circuit arrangements, for instance four, five, ten, a hundred, or more, as suitable.

The sensing elements $112_1$-$112_5$, $122_1$-$122_5$, $132_1$-$132_5$ are configured for determining the position of the floater 102 and for producing an output signal based thereon. In some embodiments, the sensing elements $112_1$-$112_5$, $122_1$-$122_5$, $132_1$-$132_5$ are magnetic detectors which sense a magnetic field produced by the floater 102. In other embodiments, the sensing elements $112_1$-$112_5$, $122_1$-$122_5$, $132_1$-$132_5$ are resistive detectors which sense an electric field produced by the floater 102. In further embodiments, the sensing elements $112_1$-$112_5$, $122_1$-$122_5$, $132_1$-$132_5$ are optical detectors. For example, the sensing elements $112_1$-$112_5$, $122_1$-$122_5$, $132_1$-$132_5$ include optical receptors which detect light produced by the floater 102. In another example, the sensing elements $112_1$-$112_5$, $122_1$-$122_5$, $132_1$-$132_5$ include one or more optical sources which produce light to illuminate the floater, and optical receptors, which detect light reflected off the floater 102. Still other types of sensing elements $112_1$-$112_5$, $122_1$-$122_5$, $132_1$-$132_5$ are considered.

In addition, embodiments where the sensing elements $112_1$-$112_5$, $122_1$-$122_5$, $132_1$-$132_5$ are configured for detecting multiple types of interactions with the floater 102 are considered. For example, a first set of the sensing elements $112_1$-$112_5$, $122_1$-$122_5$, $132_1$-$132_5$, for instance the sensing elements $112_1$-$112_5$ are configured for detecting a magnetic field produced by the floater 102, and a second set of the sensing elements $112_1$-$112_5$, $122_1$-$122_5$, $132_1$-$132_5$, for instance the sensing elements $122_1$-$122_5$, are configured for detecting an electric field produced by the floater 102. Still other combinations are considered.

In some embodiments, the sensing elements $112_1$-$112_5$, $122_1$-$122_5$, $132_1$-$132_5$ include one or more reed switches, one or more optodiode/optotransistor pairs, and the like. In some embodiments, the sensing elements $112_1$-$112_5$, $122_1$-$122_5$, $132_1$-$132_5$ are provided as a resistive ladder, or as a plurality of taps in an electrical circuit, for example the electrical circuits 110, 120, 130.

In some embodiments, the sensing elements $112_1$-$112_5$, $122_1$-$122_5$, $132_1$-$132_5$ are arranged in an interleaved pattern along the floater path for the floater 102. The sensing elements $112_1$-$112_5$, which are associated with the electric circuit 110, are spaced along the floater path in a uniform or asymmetric fashion, as appropriate, with predetermined spacing provided between each of the sensing elements $112_1$-$112_5$. The sensing elements $122_1$-$122_5$, which are associated with the electric circuit 120, are also spaced along the floater path, but, for example, are interleaved with the sensing elements $112_1$-$112_5$. In some embodiments, the sensing elements sensing elements $112_1$-$112_5$ and $122_1$-$122_5$ are interleaved such that no two sensing elements of the sensing elements $122_1$-$122_5$ are adjacent, and such that no two sensing elements of the sensing elements $112_1$-$112_5$ are adjacent. Similarly, the sensing elements $132_1$-$132_5$, which are associated with the electric circuit 130, are interleaved with the sensing elements $112_1$-$112_5$ and $122_1$-$122_5$. In other embodiments, other interleaved patterns are used. For example, the sensing elements $112_1$-$112_5$ and $122_1$-$122_5$ are interleaved such that no two sensing elements of the sensing elements $112_1$-$112_5$ are adjacent, and therebetween are disposed two or more sensing elements of the sensing elements $122_1$-$122_5$. In another example, sensing elements of the sensing elements $112_1$-$112_5$ and $122_1$-$122_5$ are interleaved such that no two sensing elements of the sensing elements $122_1$-$122_5$ are adjacent, no two sensing elements of the sensing elements $112_1$-$112_5$ are adjacent, and sensing elements of the sensing elements $132_1$-$132_5$ are interleaved therebetween, such that two sensing elements of the sensing elements $132_1$-$132_5$ are separated by multiple pairs of sensing elements of the sensing elements $112_1$-$112_5$ and $122_1$-$122_5$. Still other interleaved patterns are considered.

In other embodiments, the sensing elements $112_1$-$112_5$, $122_1$-$122_5$, $132_1$-$132_5$ are arranged in other patterns. For example, the sensing elements $112_1$-$112_5$, $122_1$-$122_5$, $132_1$-$132_5$ are arranged in three separate and distinct columns, which may be located side-by-side or distanced from one another in any suitable fashion. In another example, the sensing elements $112_1$-$112_5$ are located in a first location, for instance within the reservoir where the fluid 106 is held, and the sensing elements $122_1$-$122_5$ are located in another location, for instance on an outer wall of the reservoir. Still other arrangements are considered.

The sensing elements $112_1$-$112_5$, $122_1$-$122_5$, $132_1$-$132_5$ may be disposed within the reservoir in which the fluid 106 is located in any suitable fashion, or at some other location proximate or remote from the reservoir in which the fluid 106 is located. In some embodiments, the sensing elements $112_1$-$112_5$, $122_1$-$122_5$, $132_1$-$132_5$ are disposed on the structural member 104. In other embodiments, the sensing elements $112_1$-$112_5$, $122_1$-$122_5$, $132_1$-$132_5$ are disposed on an inner wall or other surface of the reservoir in which the fluid 106 is located. In still further embodiments, the sensing elements $112_1$-$112_5$, $122_1$-$122_5$, $132_1$-$132_5$ are disposed at some location remote from the floater 102 and the structural member 104. For example, if the reservoir in which the fluid 106 is located is a toxic or otherwise hostile environment, the sensing elements $112_1$-$112_5$, $122_1$-$122_5$, $132_1$-$132_5$ are disposed outside the reservoir or at some other remote location. For instance, the sensing elements $112_1$-$112_5$, $122_1$-$122_5$, $132_1$-$132_5$ are affixed to an outer wall or other similar structure of the reservoir.

The electrical circuits 110, 120, 130 are isolated from one another and are each communicatively coupled to a respective set of the sensing elements $112_1$-$112_5$, $122_1$-$122_5$, $132_1$-$132_5$. For example, the electrical circuit 110 is communicatively coupled to the sensing elements $112_1$-$112_5$, the electrical circuit 120 is communicatively coupled to the sensing elements $122_1$-$122_5$, and the electrical circuit 130 is communicatively coupled to the sensing elements $132_1$-$132_5$. The electrical circuits 110, 120, 130 are configured for receiving output signals produced by the sensing elements $112_1$-$112_5$, $122_1$-$122_5$, $132_1$-$132_5$ and for determining the position of the floater 102 based thereon.

The interleaved pattern for the sensing elements $112_1$-$112_5$, $122_1$-$122_5$, $132_1$-$132_5$, combined with the isolated electrical circuits 110, 120, 130, allows the FLS 100 to determine the position of the floater 102 based on the outputs from the sensing elements $112_1$-$112_5$, $122_1$-$122_5$, $132_1$-$132_5$. The electrical circuits 110, 120, 130 may determine the position of the floater based on changes in a resistance level, a current level, a voltage level, or any other suitable changing value of the sensing elements $112_1$-$112_5$, $122_1$-$122_5$, $132_1$-$132_5$. When one of the electrical circuits 110, 120, 130 fails, or if one of the sets of sensing elements $112_1$-$112_5$, $122_1$-$122_5$, $132_1$-$132_5$, malfunctions, the remaining electrical circuits 110, 120, 130 and/or the remaining sets of sensing elements $112_1$-$112_5$, $122_1$-$122_5$, $132_1$-$132_5$ may be used to determine the position of the floater 102. In embodiments where the sensing elements $112_1$-$112_5$, $122_1$-$122_5$, $132_1$-$132_5$, are not interleaved, the redundancy of separate electrical circuits 110, 120, 130 may help avoid failure of the fluid level sensor in the event of failure of some components thereof.

Additionally, in some embodiments, the outputs provided by each of the sets of sets of sensing elements $112_1$-$112_5$, $122_1$-$122_5$, $132_1$-$132_5$, may be combined to determine with increased precision the position of the floater 102. Due at least in part to the interleaved positioning and/or other arrangement of the sensing elements $112_1$-$112_5$, $122_1$-$122_5$, $132_1$-$132_5$, an interpolation algorithm or other similar algorithm may be used to increase the precision of the measured position of the floater 102. For example, if the floater is positioned between two adjacent sensing elements, for instance sensing element $112_2$ and sensing element $122_2$, the outputs from the sensing elements $112_2$ and $122_2$ are substantially identical, and the position of the floater 102 can be determined as being between sensing elements $112_2$ and $122_2$.

In addition, the position of the floater 102 as determined by the electrical circuits 110, 120, 130 may be used to determine the level of fluid 106 in the reservoir. To this end, a detector or other computing device may be used to perform any suitable algorithm using the position of the floater as determined by the electrical circuits 110, 120, 130. In some embodiments, the detector is used to detect anomalies in the FLS 100. For example, when the electrical circuit 110 outputs the position of the floater 102 as a first value and the electrical circuits 120 and 130 output the position of the floater as a second value different from the first value, the difference between the values for the position of the floater 102 may allow the detector to detect anomalous behaviour in the electrical circuit 110. In some embodiments, the detector is configured to keep track of patterns of anomalous behaviour, and once a predetermined pattern is met, the detector may produce an indication of the FLS 100 presenting anomalies, for example to a broader control system.

The electrical circuits 110, 120, 130 may together form a fluid level sensor circuit. The fluid level sensor circuit includes any suitable number of electrical circuits. Each circuit is isolated from one-another and is configured for obtaining outputs from respective sensing elements, such as the sensing elements $112_1$-$112_5$, $122_1$-$122_5$, $132_1$-$132_5$, which are based on the position of the floater 102. Each circuit is then configured to determine the position of the floater 102 based on the outputs they receive. The fluid level sensor circuit can be composed of hardware components, software components, or any suitable combination thereof. For example, each circuit can be a set of program instructions stored in a memory and executable by a processor, or they can be circuit components that are connected together to provide the functionality described hereinabove.

Figure 2:
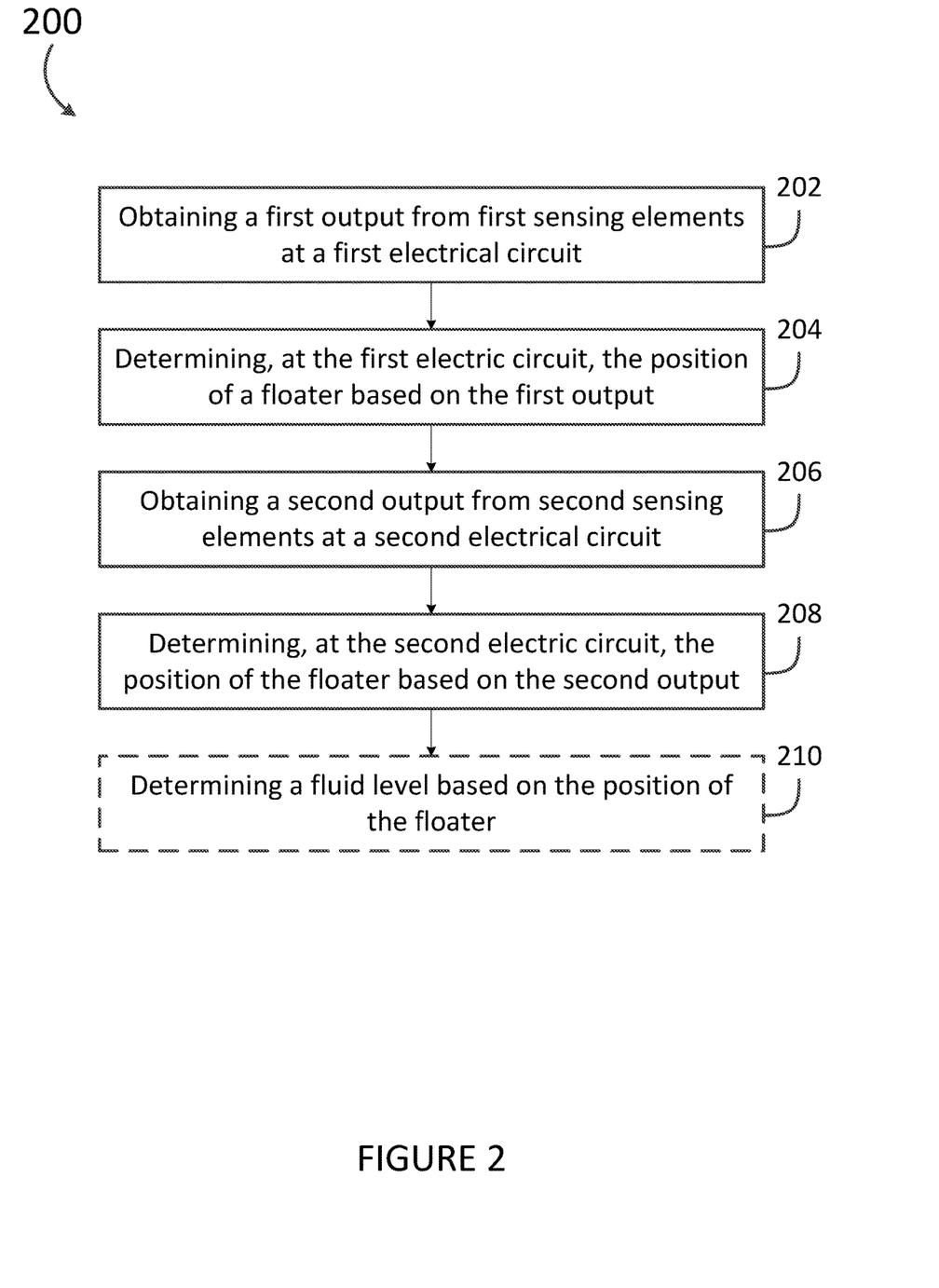
FIG. 2 is a flowchart illustrating an example method for measuring a level of a fluid.

With reference to FIG. 2, there is illustrated a flowchart of an example method 200 for measuring a level of a fluid, for example the level of the fluid 106 in the reservoir, as shown in FIG. 1. At step 202, a first output is obtained from first sensing elements at a first electrical circuit, for example from the sensing elements $112_1$-$112_5$ at the electrical circuit 110. The first output is produced by the sensing elements $112_1$-$112_5$ based on the position of a floater, for example the floater 102. In some embodiments, the floater 102 includes one or more magnetic elements which produce a magnetic field, and the sensing elements $112_1$-$112_5$ produce an output indicative of the magnetic field sensed by the sensing elements $112_1$-$112_5$. In other embodiments, the floater 102 includes one or more optical elements, and the sensing elements $112_1$-$112_5$ produce an output based on an optical interaction with the floater 102.

At step 204, the position of the floater 102 is determined by the electric circuit 110 based on the first output received at the electric circuit 110 from the sensing elements $112_1$-$112_5$. The electric circuit 110 may use any suitable algorithm and/or other calculations to determine the position of the floater 102 from the first output.

At step 206, a second output is obtained from second sensing elements at a second electrical circuit, for example from the sensing elements $1212_1$-$122_5$ at the electrical circuit 120. The second output is produced by the sensing elements $122_1$-$122_5$ based on the position of the floater 102, for instance in a substantially similar way as the sensing elements $112_1$-$112_5$ produce the first output.

At step 208, the position of the floater 102 is determined by the electric circuit 120 based on the second output received at the electric circuit 120 from the sensing elements $122_1$-$122_5$. The electric circuit 120 may use any suitable algorithms and/or other calculations to determine the position of the floater 102 from the second output.

Optionally, at step 210 a fluid level for the fluid 106 is determined based on the position of the floater 102 as determined by the electrical circuits 110 and 120. For example, an averaging or other weighting algorithm is used to determine the fluid level for the fluid 106. In another example, a machine learning algorithm is used to determine the fluid level for the fluid 106. Still other approaches for determining the level of the fluid 106 are considered.

The method 200 may be implemented by any suitable fluid level sensor, for example the FLS 100. It should be noted that in situations where the FLS implementing the method 200 includes more than two sensing-element-and-electrical-circuit arrangements, the method 200 may include additional steps which mirror steps 202 and 204, or steps 206 and 208. For example, the FLS 100 implementing the method 200 has a third electrical circuit, for instance the electrical circuit 130, and associated third sensing elements, for instance the sensing elements $132_1$-$132_5$. In such an example, the method 200 includes additional steps of obtaining a third output from the sensing elements $132_1$-$132_5$ at the electrical circuit 130, and of determining the position of the floater 102 at the electrical circuit 130 based on the third output. Optionally, step 210 may be modified to determine the fluid level of the fluid 106 based on the position of the floater as determined by the electrical circuits 110, 120, and 130. In embodiments where the FLS includes further sensing-element-and-electrical-circuit arrangements, further steps may be added to the method 200.

Note that steps 202 and 206 may be performed concurrently, and steps 204 and 208 may be performed concurrently. Similarly, steps 206 and 208 may be performed before steps 202 and 204.

Figure 3:
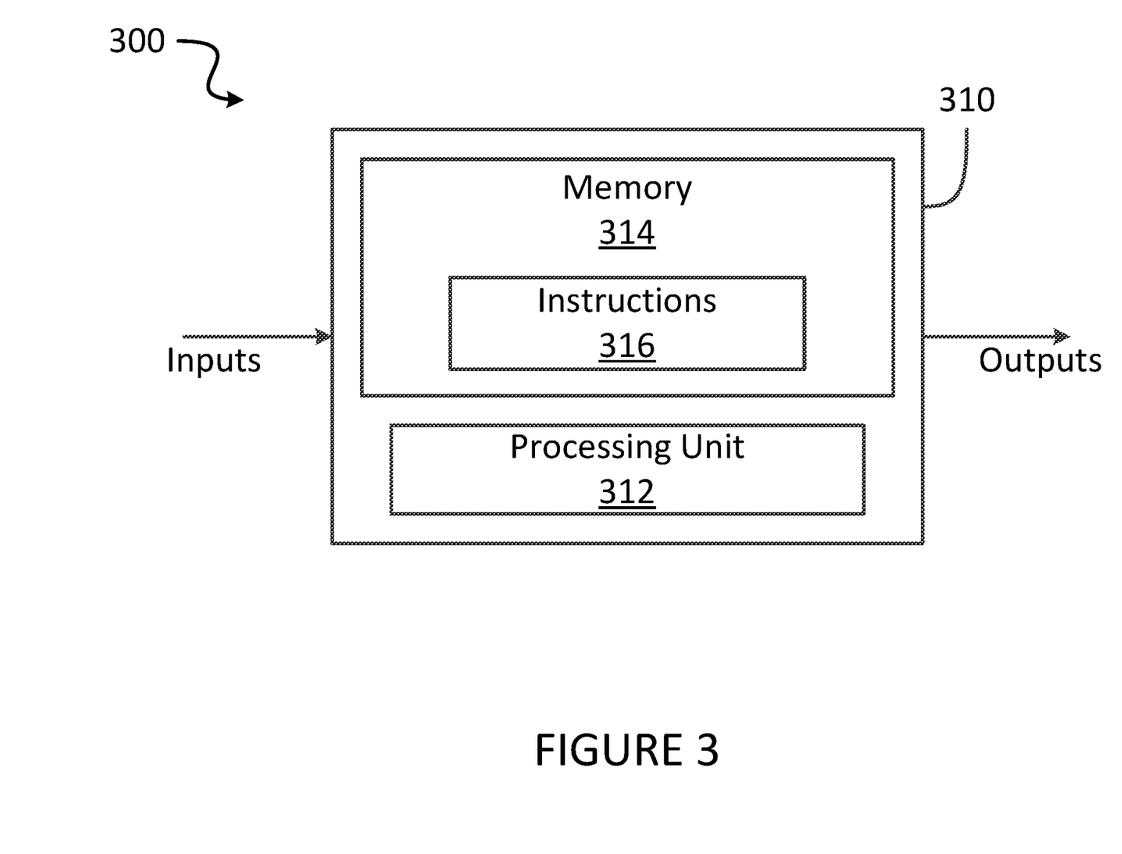
FIG. 3 is a block diagram of an example computer system for implementing the method of FIG. 2.

With reference to FIG. 3, the method 200 may be implemented by a computing device 310, comprising a processing unit 312 and a memory 314 which has stored therein computer-executable instructions 316. The processing unit 312 may comprise any suitable devices configured to implement the method 200 such that instructions 316, when executed by the computing device 310 or other programmable apparatus, may cause the functions/acts/steps performed as part of the method 200 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

Figure 4:
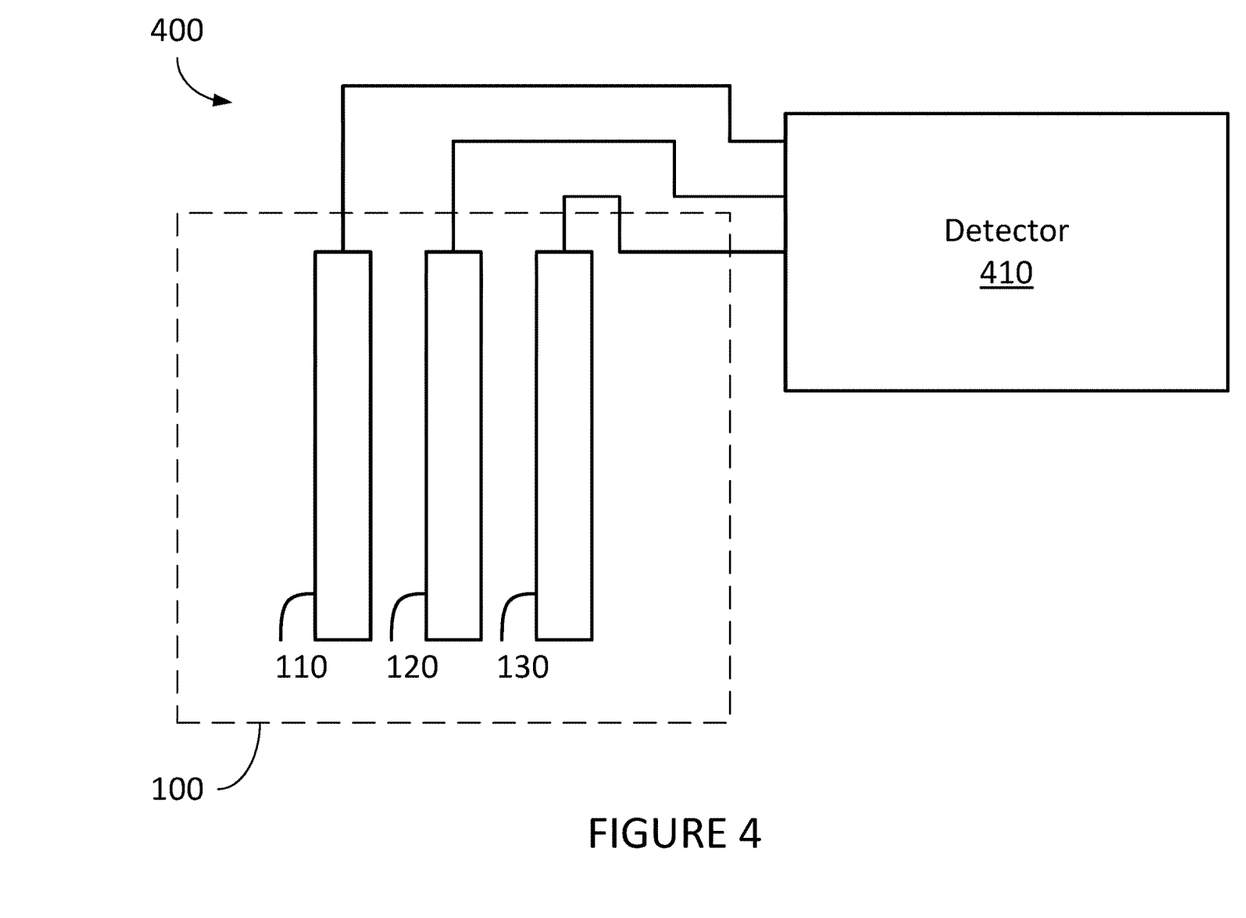
FIG. 4 is a block diagram of an example fluid level detection system.

With reference to FIG. 4, an example fluid level detection system 400 is shown. The fluid level detection system includes a detector 410 and the FLS 100. The detector 410 is communicatively coupled to the FLS 100, for example via the electrical circuits 110, 120, 130 of the FLS 100. The FLS 100 is configured for implementing steps 202, 204, 206, and 208 of the method 200, as described hereinabove.

The detector 410 is configured for receiving from the electrical circuits 110, 120, 130 the position of the floater 102. In some embodiments, the detector 410 receives a single position for the floater 102, which may be an average of the position of the floater 102 as determined by each of the electrical circuits 110, 120, 130, or any other suitable combined measurement. In other embodiments, the detector 410 receives separate readings for the position of the floater 102 from each of the electrical circuits 110, 120, 130.

The detector 410 is configured determining a level of the fluid 106 based on the position of the floater 102 as determined by the electrical circuits 110, 120, 130, as per step 210. In some embodiments, the detector 410 uses the position of the floater 102 as determined by each of the electrical circuits 110, 120, 130 and performs an averaging or other weighting algorithm to determine the level of the fluid 106. In other embodiments, a machine learning algorithm is used to determine the level of the fluid 106 based on the position of the floater 102. Still other algorithms and/or measurement techniques are considered.

The methods and systems for measuring a level of a fluid described herein may be implemented in a high level procedural or object oriented programming or scripting language, or a combination thereof, to communicate with or assist in the operation of a computer system, for example the computing device 310. Alternatively, the methods and systems for measuring a level of a fluid may be implemented in assembly or machine language. The language may be a compiled or interpreted language. Program code for implementing the methods and systems for measuring a level of a fluid may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for measuring a level of a fluid may also be considered to be implemented by way of a non-transitory computer-readable storage medium having a computer program stored thereon. The computer program may comprise computer-readable instructions which cause a computer, or more specifically the processing unit 312 of the computing device 310, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for measuring a level of a fluid may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A fluid level sensor, comprising:
a floater movable along a floater path in response to changes in a fluid level;
first sensing elements spaced apart from one another along the floater path and configured to produce a first output based on a position of the floater along the floater path;
second sensing elements spaced apart from one another along the floater path, at least one of the first sensing elements interleaved with at least one of the second sensing elements along the floater path such that the at least one of the first sensing elements is adjacent to the at least one of the second sensing elements, the second sensing elements configured to produce a second output based on the position of the floater along the floater path;
a first electric circuit coupled to the first sensing elements and configured to determine the position of the floater based on the first output; and
a second electric circuit, isolated from the first electric circuit, coupled to the second sensing elements and configured to determine the position of the floater based on the second output.

2. The fluid level sensor of claim 1, further comprising at least one detector coupled to the first and second electric circuits and configured for determining the fluid level based on the first output and the second output.

3. The fluid level sensor of claim 2, wherein determining the fluid level based on the position first output and the second output comprises comparing the first output to the second output.

4. The fluid level sensor of claim 2, wherein the detector is further configured for detecting anomalies in the fluid level sensor based on the first output and the second output.

5. The fluid level sensor of claim 1, wherein the floater comprises at least one magnetic element, and wherein at least one of the first sensing elements and the second sensing elements comprises magnetic sensors.

6. The fluid level sensor of claim 1, wherein the floater comprises at least one optical element, and wherein at least one of the first sensing elements and the second sensing elements comprises optical sensors.

7. The fluid level sensor of claim 1, wherein the floater comprises at least one electrical element, and wherein at least one of the first sensing elements and the second sensing elements comprises resistive sensors.

8. The fluid level sensor of claim 1, wherein at least one of the first sensing elements and the second sensing elements are affixed to a structural member that retains the floater.

9. The fluid level sensor of claim 8, wherein the floater is movable along an outside surface of the structural member.

10. The fluid level sensor of claim 8, wherein the floater is movable within a hollow cavity formed within the structural member.

11. The sensor of claim 1, further comprising:
at least third sensing elements, spaced apart from one another along the floater path, at least one of the at least third sensing elements interleaved with at least one of the first and second sensing elements, each of the at least third sensing elements configured to produce at least one third output based on the position of the floater; and
at least one third electric circuit, isolated from the first and second electric circuits, coupled to the at least third sensing elements and configured to determine the position of the floater based on the at least one third output.

12. A method for measuring a level of a fluid, comprising: obtaining a first output from first sensing elements at a first electrical circuit coupled to the first sensing elements, the first sensing elements configured to produce the first output based on a position of a floater movable along a floater path; determining, at the first electrical circuit, the position of the floater based on the first output; obtaining a second output from second sensing elements at a second electrical circuit coupled to the second sensing elements, the second electrical circuit being isolated from the first electrical circuit, at least one of the first sensing elements being interleaved with at least one of the second sensing elements along the floater path such that the at least one of the first sensing elements is adjacent to the at least one of the second sensing elements, the second sensing elements configured to produce the second output based on the position of the floater; and determining, at the second electrical circuit, the position of the floater based on the second output.

13. The method of claim 12, further comprising determining a fluid level based on the first and second outputs.

14. The method of claim 13, wherein determining the fluid level based on the first and second outputs comprises comparing the first output to the second output.

15. The method of claim 13, further comprising detecting anomalies in the fluid level sensor based on the first output and the second output.

16. The method of claim 12, wherein obtaining the first output comprises sensing at least one magnetic element of the floater via the first sensing elements and wherein obtaining the second output comprises sensing the at least one magnetic element of the floater via the second sensing elements.

17. The method of claim 12, wherein obtaining the first output comprises sensing at least one optical element of the floater via the first sensing elements and wherein obtaining the second output comprises sensing the at least one optical element of the floater via the second sensing elements.

18. The method of claim 12, wherein obtaining the first output comprises sensing at least one electrical element of the floater via the first sensing elements and wherein obtaining the second output comprises sensing the at least one electrical element of the floater via the second sensing elements.

19. The method of claim 12, further comprising:
obtaining at least one third output from third sensing elements via at least one third electrical circuit coupled to the third sensing elements, the third sensing elements being interleaved with at least one of the first and second sensing elements, the at least one third electrical circuit being isolated from the first and second electrical circuits, the third sensing elements configured to produce the at least one third output based on the position of the floater; and determining, at the at least one third electrical circuit, the position of the floater based on the at least one third output.

20. A fluid level sensor circuit comprising:

a first circuit configured for:
- obtaining a first output from first sensing elements configured to produce the first output based on a position of a floater movable along a floater path; and
- determining the position of the floater based on the first output; and a second circuit isolated from the first circuit and configured for:
- obtaining a second output from second sensing elements configured to produce the second output based on the position of the floater, at least one of the first sensing elements interleaved with at least one of the second sensing elements along the floater path such that the at least one of the first sensing elements is adjacent to the at least one of the second sensing elements; and
- determining the position of the floater based on the second output.

* * * * *